(12) United States Patent  
Mikkelsen et al.

(10) Patent No.: US 7,510,111 B2  
(45) Date of Patent: Mar. 31, 2009

(54) FRONT PROJECTION SCREEN ASSEMBLY (75) Inventors: Henrik Bang Mikkelsen, Chula Vista, CA (US); Louis Alan Mannick, San Pedro, CA (US); Alexander Montagu Hay, Bellevue, WA (US)

(73) Assignee: DNP Denmark A/S, Karlslunde (DK)

( * ) Notice: Subject to any disclaimer, the term of this patent is extended or adjusted under 35 U.S.C. 154(b) by 422 days.

(21) Appl. No.: 11/323,645

(22) Filed: Dec. 29, 2005

(65) Prior Publication Data

US 2007/0153379 A1 Jul. 5, 2007

(51) Int. Cl.  
*G06F 17/00* (2006.01)

(52) U.S. Cl. ........................... 235/375; 359/461

(58) Field of Classification Search ............. 235/375; 359/461, 443, 453, 456  
See application file for complete search history.

(56) References Cited

U.S. PATENT DOCUMENTS

| | | | |
|---|---|---|---|
| 5,296,964 A | * | 3/1994 | Shopp ................. 359/443 |
| 6,552,847 B2 | * | 4/2003 | Congard ............... 359/445 |
| 6,873,458 B1 | * | 3/2005 | Bakkom et al. ........ 359/443 |
| 6,876,493 B1 | * | 4/2005 | Lin .................... 359/461 |
| 7,180,665 B2 | * | 2/2007 | Daniel et al. .......... 359/461 |
| 2005/0162740 A1 | * | 7/2005 | Hou .................... 359/461 |

FOREIGN PATENT DOCUMENTS

| | | |
|---|---|---|
| JP | 04 4331943 A | 11/1992 |
| JP | 05 297466 A | 11/1993 |
| JP | 7261273 | 10/1995 |
| JP | 09 311385 A | 12/1997 |
| JP | 2001-228545 A | 8/2001 |

* cited by examiner

*Primary Examiner*—Edwyn Labaze  
(74) *Attorney, Agent, or Firm*—Butler, Snow, O'Mara, Stevens & Cannada PLLC (57) ABSTRACT

A front projection screen assembly comprising, a rectangular sheet of a flexible screen material and a roller on which said flexible screen material may be wound and unwound, said flexible screen material defining a first plane in the unwound condition. The front projection screen assembly comprises top, bottom, left-hand and right-hand side frame members, framing said rectangular sheet of flexible screen material along respective top, bottom, left-hand and right-hand sides thereof. At least said side frame members comprise shape memory members.

17 Claims, 6 Drawing Sheets

FRONT PROJECTION SCREEN ASSEMBLY

BACKGROUND OF THE INVENTION

The present invention relates to front projection screen assembly for displaying images projected thereon by means of an image projector. Front projection screens have been known for centuries, and for the past century they have been widely used for public display of moving images. Recently, however, the falling costs of image projectors and the availability of appropriate electronic storage media, such as DVD, have created a growing interest in what is commonly referred to as home cinema. Also, the falling costs have made projection systems a natural part of modern meeting rooms and smaller auditoriums.

Evidently, a front projection screen of high quality comes as a natural part of such a home cinema or of the projection system in such a meeting room or smaller auditorium. Since, however, most of the time the projection screen is not in use, there is often a demand for screens which are inconspicuous when not in use. Making the projection screen inconspicuous when not in use, traditionally involves rolling it up, or folding it together, in order make the apparent area smaller, or even to make the projection screen able to be stowed somewhere else.

The need to be able to roll up the screen, however, poses some technical problems in respect of screen quality. One such problem stems from the fact that the screen must be flexible. Unlike a rigid screen, a flexible screen is prone to have deformations such as e.g. wrinkles, undulations or bends over the surface or along the border because of different tension forces across the screen, when it is in the rolled-out state. Also when the screen is rolled up on a drum or a roller, the inner windings may come under pressure causing semi-permanent deformations of the screen, which will be visible the next time the screen is rolled out.

Japanese application 2001-228545 (Nishitani Masatake et al) addresses the above problems. In relation to the wrinkles or undulations it suggests slitting the screen material along the vertical sides of the screen. In relation to the semi-permanent deformations it suggests a buffer or transition material in connection with the winding drum, so that the level difference does not propagate to the outer windings and deforms them.

Whereas traditional cinema is traditionally viewed in a darkened room, this is not necessarily the case for home cinema. Thus, also in use, there is a need for the front projection screen to be inconspicuous and aesthetically pleasing. The same would be the case if the front projection screen is used in a meeting room, where the viewers might need light to take notes and do other work-related things.

BRIEF SUMMARY OF THE INVENTION

On this background it is the object of the invention to provide a projection screen assembly, in which the projection screen may be rolled up when not in use and which is substantially free of the above problems.

It is also an object of the invention to provide a novel front projection screen assembly, which is as inconspicuous as possible when the screen is in the rolled-out state.

According to a first aspect of the invention, this object is achieved by a front projection screen assembly comprising a rectangular sheet of a flexible screen material and a roller on which said flexible screen material may be wound and unwound, said flexible screen material defining a first plane in the unwound condition, wherein said front projection screen assembly comprises top, bottom, left-hand and right-hand side frame members, framing said rectangular sheet of flexible screen material along respective top, bottom, left-hand and right-hand sides thereof, and wherein at least said side frame members comprise shape memory members.

According to a second aspect of the invention, this object is achieved by a front projection screen assembly comprising a rectangular sheet of a flexible screen material and a roller on which said flexible screen material may be wound and unwound, said flexible screen material defining a first plane in the unwound condition, wherein said front projection screen assembly comprises top, bottom, left-hand and right-hand side frame members, framing said rectangular sheet of flexible screen material along respective top, bottom, left-hand and right-hand sides thereof, and wherein the roller comprises a longitudinal recess adapted for receiving said top frame member, when the screen is wound on said roller.

BRIEF DESCRIPTION OF THE DRAWINGS

Examples of the invention will now be explained below with reference to the very schematic drawings, in which.

DETAILED DESCRIPTION OF THE INVENTION

Figure 1:
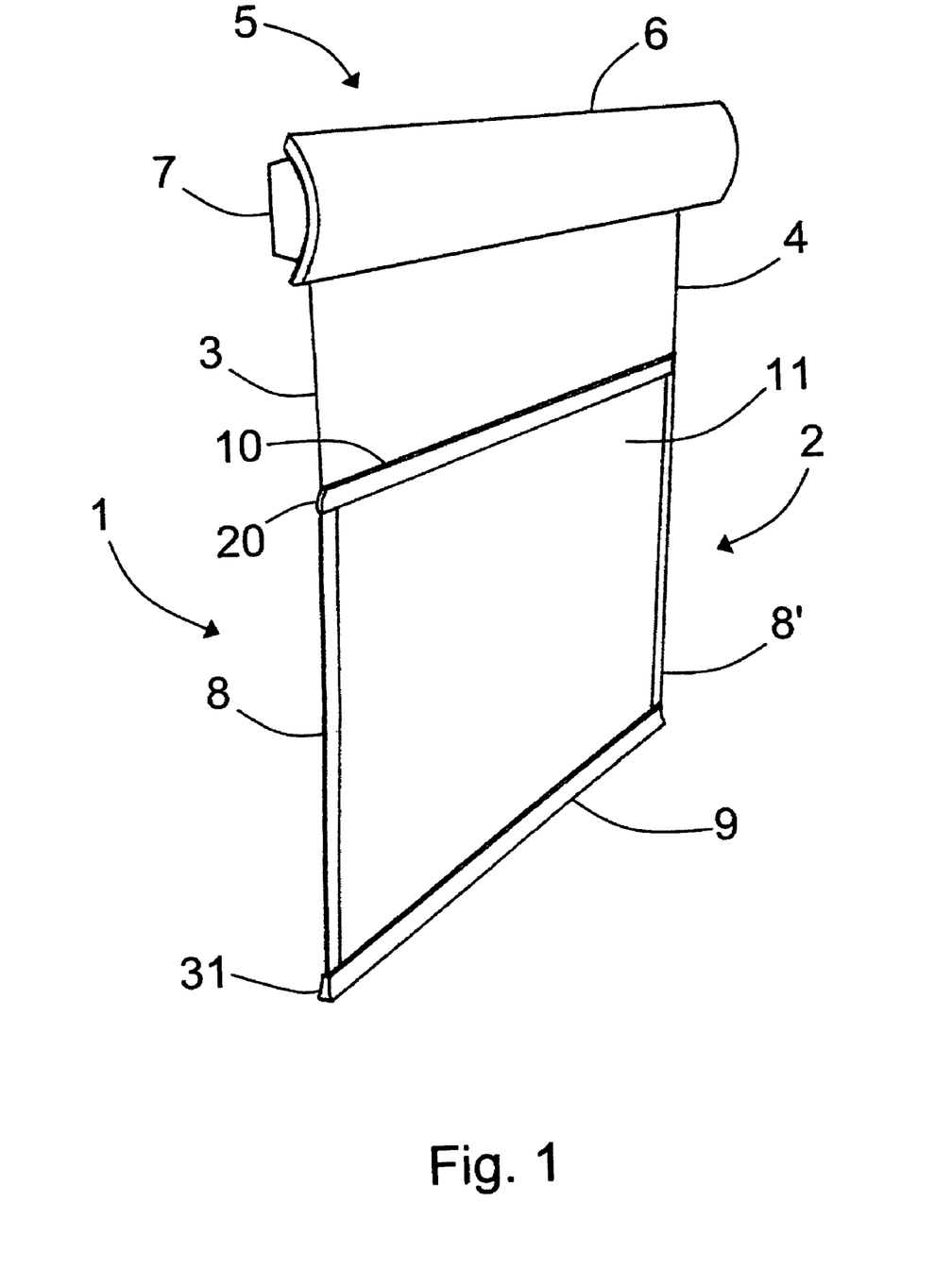
FIG. 1 is a front perspective view of a front projection screen assembly according to the invention in the rolled-out state.

FIG. 1 is a schematic view of the front projection screen assembly 1 according to the invention. The front projection screen is shown in front perspective view, i.e. from the viewer and projection side thereof. In the following, detailed description terms such as up, down, top, bottom, front, back, behind, left, right etc. are used in their normal sense as understood by a viewer observing the projection side of the front projection screen, i.e. as shown in FIG. 1.

The front projection screen assembly 1 comprises a framed projection screen part 2, which in the rolled-out condition illustrated in FIG. 1 hangs suspended in two suspension cords 3, 4. The front projection screen assembly 1 further comprises a top box 5 in which the framed projection screen part 2 and the two suspension cords 3, 4 are accommodated when the framed projection screen part 2 is in the rolled-up condition. The top box comprises a front shield 6 and end shields 7, which hide the framed projection screen part 2 and the two suspension cords 3, 4 from view, when the framed projection screen part 2 is in the rolled-up condition, thus giving the front projecting screen assembly 1 an inconspicuous appearance when the framed projection screen part 2 is in the rolled-up condition, as it would normally be when not in use. The top box 5 is adapted to be mounted on a wall, not shown, but located behind the framed projection screen part 2 in the rolled out condition. The fact that the framed projection screen part 2 hangs suspended from cords 3, 4 moreover makes the projection screen assembly more aesthetically pleasing in the rolled-out condition, because no large masked unused projection area is present above the effectively used screen part. This again, lets the user place the top box closer to the ceiling of the room, in which the projection screen assembly 1 is installed, which in turn makes the projection screen assembly even more inconspicuous when not in use.

As seen in FIG. 1, the framed projection screen part 2 comprises four frame members 8, 8', 9, 10 framing four sides of a generally rectangular, flexible screen material 11. Some, or all, of the frame members may be colored, e.g. black, in order to make them non-reflecting so as to define a viewing area on the flexible screen material 11.

The main purpose of the four frame members, however, is to support the flexible screen material 11 in the rolled-out state of the framed projection screen part 2, so as to ensure that the projection area on the flexible screen material 11 defines a plane surface, without any wrinkles, undulations, bends or the like, e.g. at the edges.

For this purpose, the four frame members 8, 8', 9, 10 all need to have a certain rigidity in the direction coinciding with the plane surface defined by the flexible screen material 11. On the other hand, the side frame members 8, 8' need to have some flexibility in the direction perpendicular to the surface defined by the flexible screen material, in order for them to form coils, when the framed projection screen part 2 is rolled up on a roller 12 illustrated in FIGS. 6 and 7.

For this purpose, each of the side frame members 8, 8' are made of a shape memory material such as a band of spring steel. Preferably the shape of the spring steel band, to which it urges to return, is straight. In that case the spring steel is put under tension when the screen is rolled up on the roller 12. Alternatively the shape, to which the spring steel band urges to return, is a coil matching the periphery of the roller 12. In that case the spring steel is put under tension by the weight of the bottom frame member 9, which, as will be explained below, is in fixed connection with the side frame members 8, 8'.

In an alternative embodiment, not shown, the frame side members could be snap acting bands which may snap between concave and convex cross sections. E.g. snapping between a straight condition having a slightly concave cross section, and a coiled condition having a slightly convex cross section.

Figure 2:
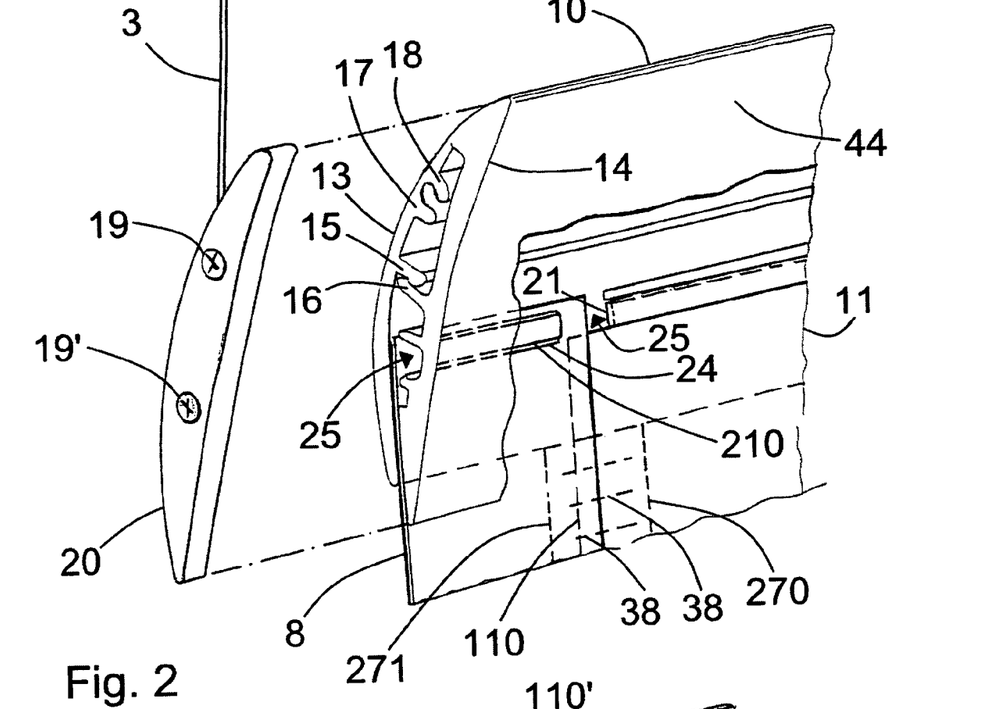
FIG. 2 is a partially cut away detailed view of the upper left-hand corner of the framed projection screen part of the front projection screen of FIG. 1.

FIG. 2 shows the top left-hand corner of the framed screen part 2, where the left-hand side frame member 8 is connected to the top frame member 10.

Figure 3:
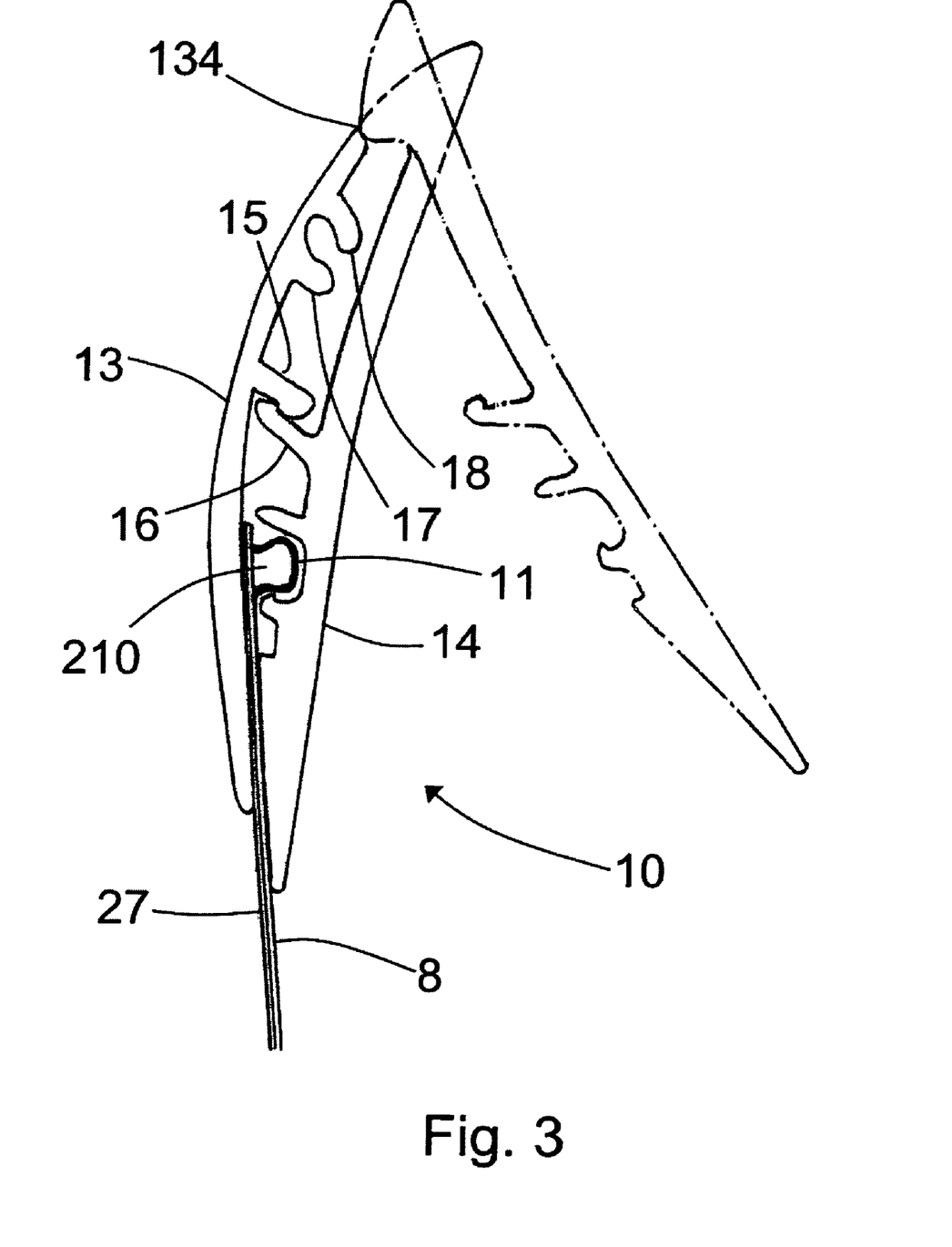
FIG. 3 is an end view of the top frame member of the front projection screen of FIG. 1 with the left-hand side frame member and the flexible screen material clamped therein.

As best seen from FIG. 3, the top frame member 10 comprises two preferably hinged parts 13, 14, which when joined into locking engagement may clamp the side frame members 8, 8' and the flexible screen member 11, and hold them firmly. The top frame member 10 is preferably a single extruded profile of aluminium or another suitable material. The two hinged parts 13, 14 are joined by a thin foil hinge 134, formed in the extrusion process. The foil hinge 134 basically only serves the purpose of holding the two hinged parts 13, 14 together until they are joined in locking engagement, and for the correct positioning when doing do. Since it is not the intention that the locking between the two parts should be released, once the side frame members 8, 8' and the flexible screen member 11, has been clamped between them, the mechanical requirements to the foil hinge 134 is very low. The skilled person will realize that other types of hinges are also possible, and that the two parts 13, 14 may also be provided as two separate parts, thus omitting the hinge entirely.

For the locking, two mutually engaging barbed protrusions 15, 16, are provided in the profile. One or both of the hinged parts 13, 14 may also have protrusions 17, 18 forming engagement means for longitudinal fastening means such as screws 19, 19' for holding an end cap 20, as illustrated in FIG. 2.

For holding the flexible screen member 11 in place in the top frame part 10, the hinged part 13 comprises a longitudinal bead 21, which together with two further protrusions 22, 23 on the hinged part 14, forms a labyrinth through which the flexible screen member 11 passes for increased friction. The flexible screen member 11 may thus be held firmly and straight, without any wrinkles, undulations or the like along the length of the top frame part 10.

The bead 21 also serves to hold the side frame parts 8, 8' in position when clamped between the two hinged parts 13, 14. Since the side frame members 8, 8' are made of spring steel, they cannot simply be wrapped around the longitudinal bead 21. Instead a rectangular cut-out 24, 24' is provided at the top of each of the side frame members 8, 8'. Correspondingly, short sections 25 of the bead 21 have been removed from the bead 21 so as to provide a short section 210 of the bead 21 around which the cut-out 24, 24' can be placed. Thus when the screen is in the rolled-out condition, the short section 210 carries the weight of the side frame part 8, as well as half of the weight of the bottom frame member 9, the other half being carried by the right hand side frame member 8' hanging on a corresponding short section at the other end of the top frame member 10 (not shown).

Figure 4:
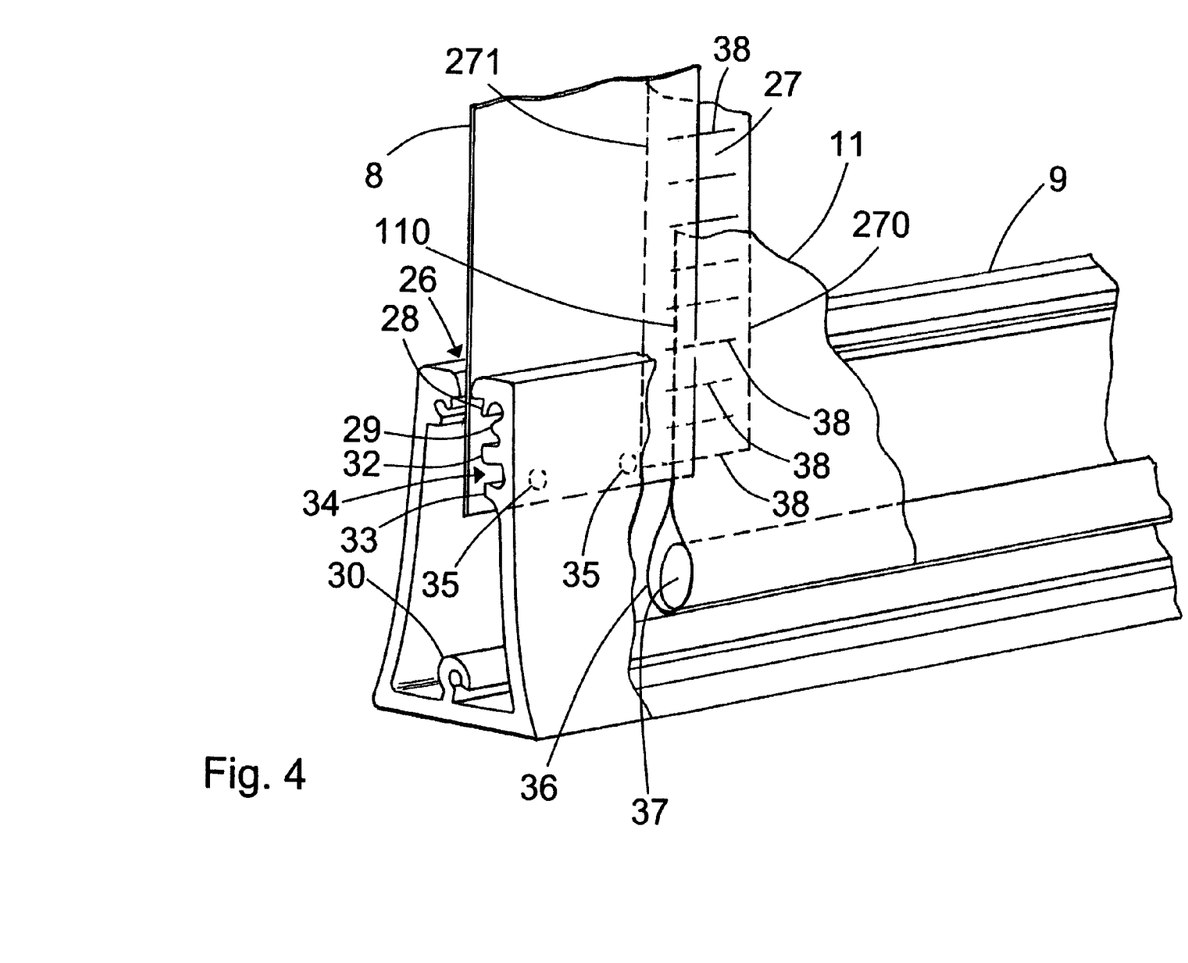
FIG. 4 is a partially cut away detailed view of the lower left-hand corner of the framed projection screen part of the front projection screen of FIG. 1.

As indicated above, the side frame member 8 is connected to the bottom frame member 9. This can best be seen from FIG. 4, showing the lower left-hand corner with parts cut away. The bottom frame member 9 is preferably formed as an extruded profile of aluminium or other suitable material. The bottom frame member 9 has a slit 26 along the entire length of the top to allow the side frame members 8, 8' and the flexible screen member 11 as well as a tensioning means 27, which will be described in detail below, to enter. Like the top frame member 10, the profile of the bottom frame member 9 has a number of protrusions 28, 29, 30 serving as engagement means for securing means, such as screws, entering in the longitudinal direction, e.g. for securing an end cap 31 to the bottom frame member 9. The bottom frame member 9 further comprises two protrusions 32, 33, defining between them a recess 34 for receiving securing means, such as one or more screws, for the side frame member 8. In the illustrated example two screws, not shown, are inserted through two bores in the back of the bottom frame member 9, not visible, through registering bores 35 in the frame side member 8, into the recess 34. The sides of the recess 34 may be provided with small longitudinal grooves engaging the threads of the screws for better hold. The weight of the bottom frame member 9 including end caps 31, is sufficient to keep the side frame members 8, 8' straight in the rolled-out position of the framed screen part 2.

As mentioned above, the flexible screen member 11 also enters into the bottom frame member 9 through the slit 26. The flexible screen member 11, however, is not secured to the bottom frame member 9. Rather, the lower end of the flexible screen member 11, hangs freely suspended in the bottom frame member. To keep the flexible screen member 11 under sufficient tension in the vertical direction to avoid folds, bends, wrinkles, undulations or the like, the lower end has been looped to form a pocket 36, in which a preferably rod-shaped weight 37, such as an iron rod, has been inserted.

Figure 5:
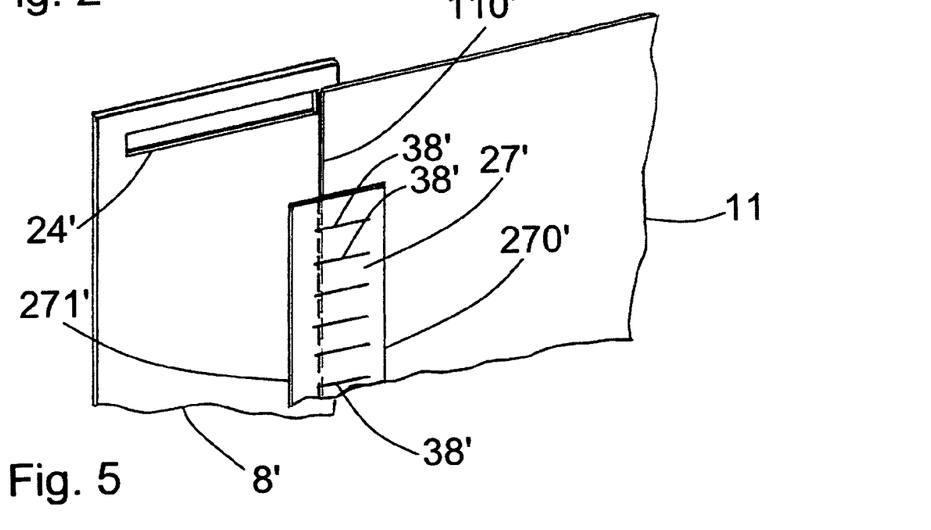
FIG. 5 is a detailed view of the right-hand side frame member, the tensioning means and the flexible screen material in the top right-hand corner of the framed member as seen from the back of the screen.

The flexible screen material 11 is not connected directly to the side frame members 8, 8'. The flexible screen material 11 and the respective side frame members 8, 8' have an overlap. As can best be seen from FIGS. 2, 4 and 5, the side frame members 8, 8' overlap the front side of the flexible screen material, so that the edges 110, 110' of the flexible screen material 11 are hidden from the observer's view by the side frame members 8, 8'. This overlap is biased towards a larger overlap by means of a tensioning means, e.g. an elastic ribbon 27 extending along the direction of the overlap. The flexible screen material 11 is attached to one edge 270, 270' of the elastic ribbon 27, and a respective side frame member 8, 8' is attached to the other edge 271, 271' of the elastic ribbon 27.

With the arrangement described above, the side frame members 8, 8' can readily be constructed so that they resist any deformation in the horizontal direction from the flexible screen material 11 and the tensioning means 27, while at the same time the flexible screen material 11 is kept straight in the horizontal direction. In the preferred embodiment, the side frame members 8, 8' are spring steel bands with a thickness selected in the range of approximately 0.1 mm to approximately 0.2 mm, and a width of approximately 40 mm, which has been found suitable for lengths of side frame members in the range of approximately 500 mm to approximately 1500 mm. The flexible screen member 11 is in that case preferably a base PET polymer film with a thickness selected in the range of approximately 0.1 mm to approximately 0.2 mm, provided with lens elements formed in a UV cured layer on a surface thereof.

In order to avoid any contraction in the vertical direction caused by the elastic ribbon 27, 27', the ribbon is preferably provided with a number of horizontal slits 38, 38', preventing any force to be transferred along the length of the ribbon 27, 27'. Thus, when the framed projection-screen part 2 is in the rolled-out condition, the flexible screen material 11 basically hangs freely suspended from the top frame member 10, kept straight in the vertical direction by the weight of the rod-shaped weight 37, and kept straight in the horizontal direction by the elastic ribbons 27, 27' attached to the side frame members 8, 8', which are in turn kept straight by their inherent properties, and the weight of the bottom frame member 9 and the end caps 31.

Figure 6:
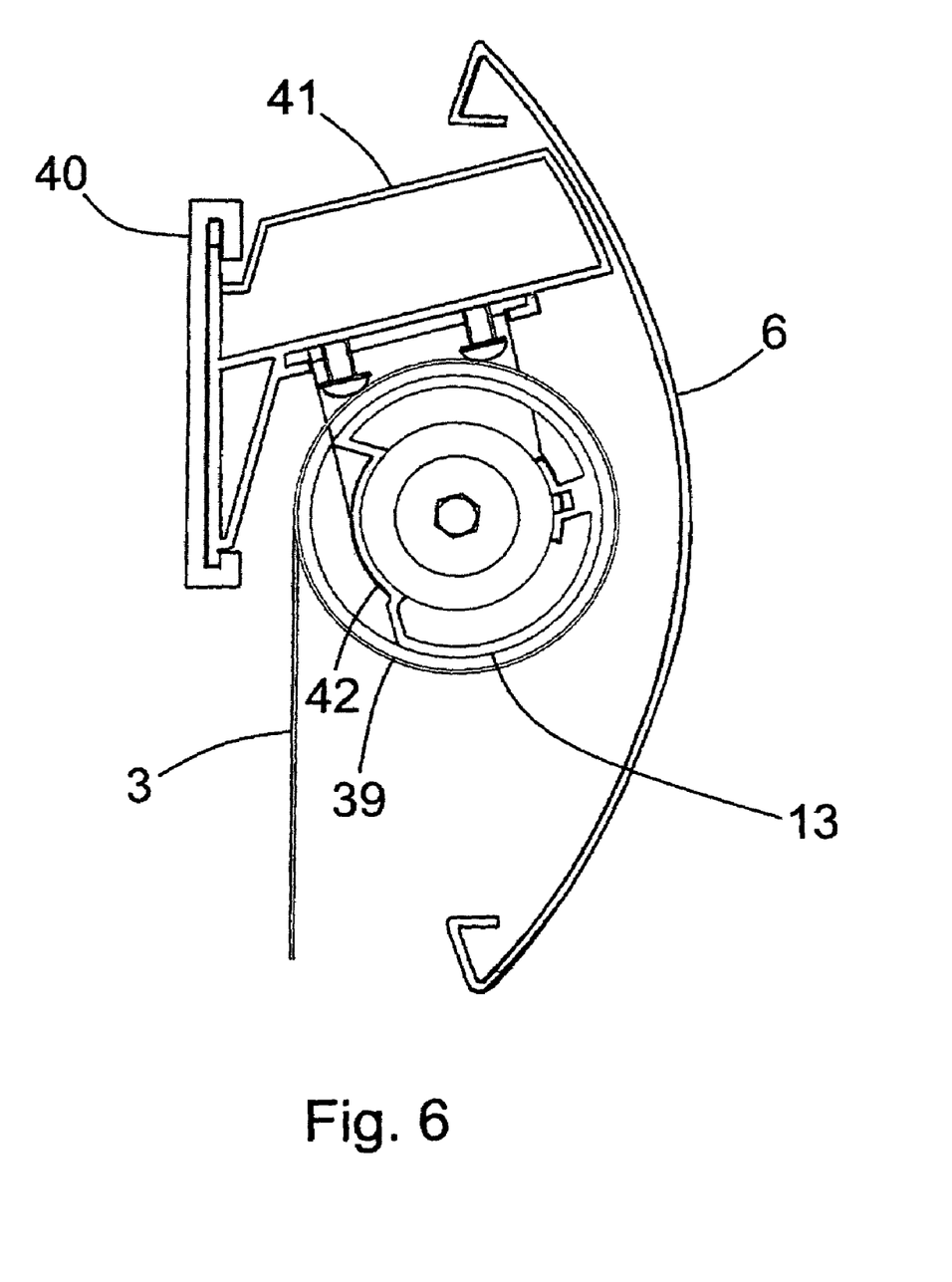
FIG. 6 is an end view of the top box of the projection screen assembly of FIG. 1 in the rolled-out state, but with the end cap removed.

Turning now to FIGS. 1 and 2, it can be seen that the framed projection screen part 2 itself hangs suspended from cords 3, 4 attached at their lower end to the end caps 20 of the top frame member 10. The other end of the cords 3, 4 are attached to respective bobbins 39, one of which is visible in FIG. 6, showing an end view of the top box 5 with the end cap 7 removed. For reasons which will be described below, the lengths of the cords 3, 4 need to be quite well defined. The end caps 20 may thus comprise adjusting means for adjusting the length of the cords 3, 4.

The top box 5 comprises a wall mounting bracket 40, holding a carrier member 41, on which the roller 13 together with the bobbins is mounted and to which the front shield 6 is attached. The carrier member 41 preferably also holds other parts of the projection screen assembly 1 such as control circuitry for an electric motor for the operation of the screen assembly. These parts are not considered relevant for the present invention and are thus neither shown, nor described any further.

When the framed projection screen part 2 is in the rolled-up condition, not shown in the figures, the cords 3, 4 are wound up on respective bobbins 39 arranged at either end of the roller 13, on which the framed projection screen part 2 is wound.

Figure 7:
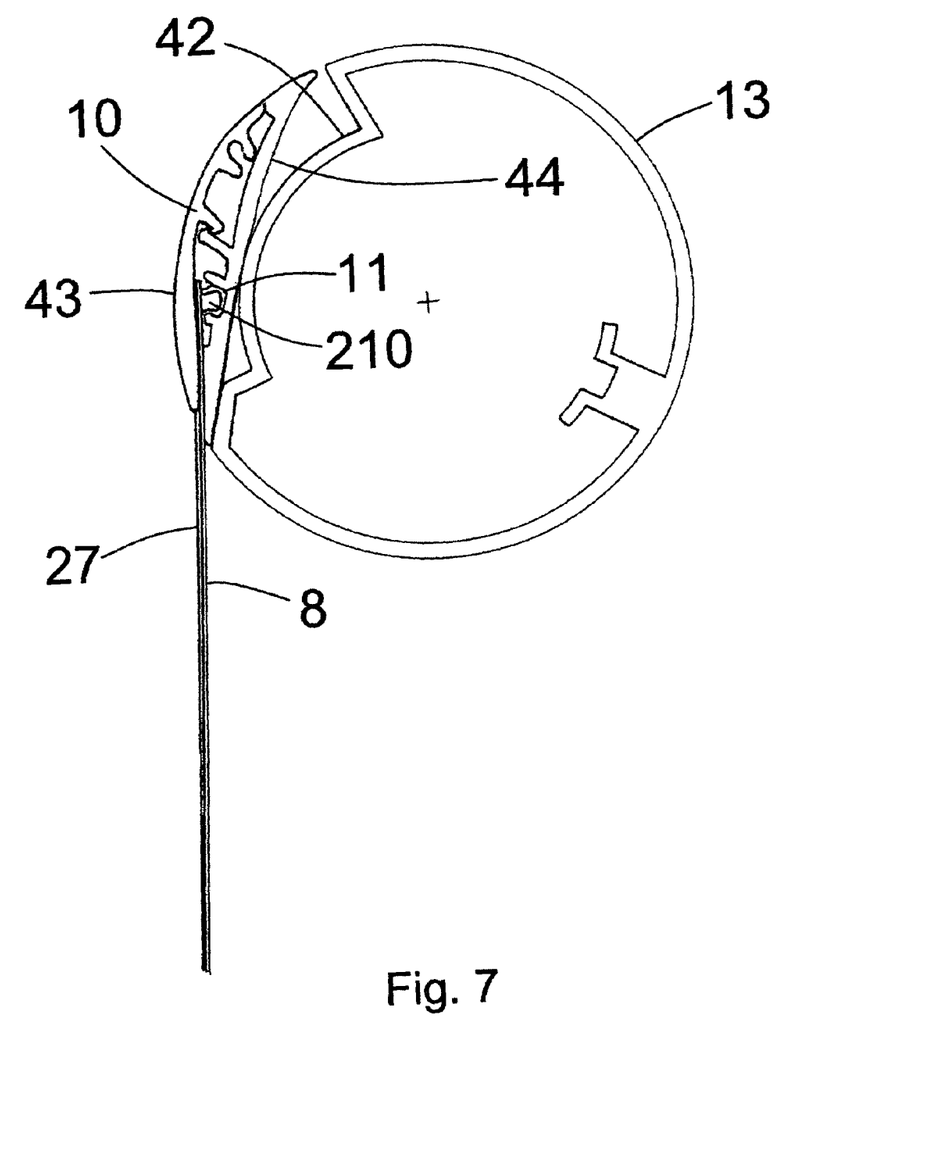
FIG. 7 is an end view of the roller with the top frame member located in a recess therein, but with the bobbin removed for visibility.

These bobbins 39 preferably comprise spiral grooves ending adjacent to a recess 42 in the roller 13. The length of the cords 3, 4 are minutely adapted to the length of the spiral groove on the bobbin 39, so that when the entire length of cord 3, 4 wound up on the bobbin, the top frame member 10 falls into the recess 42 of the roller 13, as illustrated in FIG. 7. For the same reason the cords 3, 4 are made of a relatively inelastic material, so that the end point is well defined. The cords 3, 4 are thus preferably made of a an aromatic polyamide fiber material, such as Kevlar® or Spectra, which furthermore has the advantage that it may readily be dyed to suit the background color of a wall behind the screen assembly 1. As can be seen from FIG. 7, showing the roller 13 and the top frame member 10, with the bobbin 39 and the end cap 20 removed, the top frame member 10 has a cross section with a convex surface 43 and a concave surface 44. The concave surface 44 is adapted to the size and shape of the recess 42, to allow the convex surface 43 to have a smooth transition to the generally cylindrical surface of the roller 13. Thus, when the framed projection screen part 2 is rolled onto the roller 13, the top frame member 10 will be located in the recess 42 in the roller 13, in such a way that it does not deform the flexible screen material 11, when the screen assembly is not in use.

The invention has been described in detail based on a preferred embodiment. The skilled person however will know that numerous variations are possible within the scope of the appended claims, in particular in respect of choice of materials and dimensions. The skilled person will also realize that the use of an elastic ribbon such as the one describes in connection with the side frame members, could be used along the other sides of the flexible screen material, e.g. interposed between the lower edge of the flexible screen material and the rod-shaped weight, possibly instead of the loop, or in conjunction with the top frame member and the upper edge of the flexible material.

The invention claimed is:

1. A front projection screen assembly comprising,
   a top box,
   a rectangular sheet of a flexible screen material and
   a roller located in said top box, on which roller said flexible screen material may be wound and unwound, said flexible screen material defining a first plane in the unwound condition,
   wherein said front projection screen assembly comprises top, bottom, left-hand and right-hand side frame members, framing said rectangular sheet of flexible screen material along respective top, bottom, left-hand and right-hand sides thereof, and at least said side frame members comprise shape memory members, and
   wherein said top frame member is connected to said roller via at least one cord.

2. A front projection screen assembly according to claim 1, wherein said shape memory members comprise steel bands.

3. A front projection screen assembly according to claim 1, wherein said shape memory members comprise a band with a curved cross section.

4. A front projection screen assembly according to claim 1, wherein said side frame members are rigidly connected to said bottom frame member.

5. A front projection screen assembly according to claim 1, wherein tensioning means for said flexible screen material are provided.

6. A front projection screen assembly according to claim 5, wherein said side frame members overlap the flexible screen material, and wherein said tensioning means comprise an elastic material arranged along said overlap, so as to provide a bias in the direction of a larger overlap.

7. A front projection screen assembly according to claim 6, wherein said strip of elastic material comprises slits.

8. A front projection screen assembly according to claim 5, wherein said bottom frame member comprises a hollow profile having a slit along one side, through which said flexible screen member extends, said tensioning means being located within said hollow profile.

9. A front projection screen assembly according to claim 8, wherein said tensioning means is at least one weight suspended by said flexible screen material within said hollow profile.

10. A front projection screen assembly according to claim 1, wherein said front projection screen assembly comprises a top box in which said roller is located.

11. A front projection screen assembly comprising, a rectangular sheet of a flexible screen material and a roller on which said flexible screen material may be wound and unwound, said flexible screen material defining a first plane in the unwound condition, wherein said front projection screen assembly comprises top, bottom, left-hand and right-hand side frame members, framing said rectangular sheet of flexible screen material along respective top, bottom, left-hand and right-hand sides thereof, and wherein the roller comprises a longitudinal recess adapted for receiving said top frame member, when the screen is wound on said roller, wherein said top frame member is connected to said roller via at least one cord.

12. A front projection screen assembly according to claim 11, wherein said roller comprises two bobbins connected to two cords, one at either end of the roller, on which bobbins the cords may be wound and unwound.

13. A front projection screen assembly according to claim 11, wherein said top frame member has at least one convex surface with a curvature corresponding to the curvature of said roller, so as to provide a flush transition between said roller and said top frame member, when said top frame member is received in said recess.

14. A front projection screen assembly according to claim 11, wherein said top frame member comprises two hinged parts, comprising mutually engaging parts adapted for clamping and retaining the flexible screen member along the top side thereof.

15. A front projection screen assembly according to claim 14, wherein said two hinged parts of the top frame member are provided as a single integrally extruded aluminium member.

16. A front projection screen assembly according to claim 11, wherein said at least one cord comprises aromatic polyamide fibers.

17. A front projection screen assembly according to claim 11, wherein said front projection screen assembly comprises a top box in which said roller is located.

* * * * *